United States Patent [19]

McDonald

[11] 4,413,969

[45] Nov. 8, 1983

[54] METHOD AND APPARATUS FOR RE-CYCLING PLASTICS WASTE

[75] Inventor: William J. McDonald, Helen's Bay, Northern Ireland

[73] Assignee: James Mackie & Sons Limited, Belfast, Northern Ireland

[21] Appl. No.: 329,332

[22] Filed: Dec. 10, 1981

[30] Foreign Application Priority Data

Dec. 16, 1980 [GB] United Kingdom ............... 8040298

[51] Int. Cl.³ .................. B29F 3/08; C08J 11/00
[52] U.S. Cl. ........................ 425/217; 425/378 R; 425/DIG. 55; 264/37; 264/DIG. 69; 521/47
[58] Field of Search ............. 264/37, DIG. 69; 521/47; 425/217, 145, DIG. 55, 378 R

[56] References Cited

U.S. PATENT DOCUMENTS

| | | | |
|---|---|---|---|
| 2,485,523 | 10/1949 | Ashbaugh | 425/145 |
| 2,938,230 | 5/1960 | Sainty | 264/141 |
| 3,389,203 | 6/1968 | Merges et al. | 264/140 |
| 4,240,997 | 12/1980 | Jex | 425/145 |

*Primary Examiner*—Allan Lieberman

*Attorney, Agent, or Firm*—Stevens, Davis, Miller & Mosher

[57] ABSTRACT

A conveyor 4 driven by a motor 5 feeds thermoplastic waste material 2, such as the trimmed-off edges of extruded plastics sheets, to a compression chamber 8 at the inlet of a heating box 10 of an extruder 11. The conveyor operates intermittently in synchronism with the movement of a plunger 40 operated by a hydraulic cylinder 42 which compresses the waste material to the level of a restraining member 50 controlled by a pneumatic cylinder 54. The member 50 comes into operation as the plunger 40 reaches the bottom of its stroke and holds the plastics material in a compressed condition while the plunger 40 rises again, further material 2 is fed to the chamber 8 and the cycle is repeated, the member 50 being withdrawn shortly before the plunger 40 reaches the bottom of its stroke. Plastics material is progressively melted as it passes down the box 10 and under the pressure exerted by the compressed material is extruded through a die plate 16 in the form of strands 18 which, after passing through a water bath 20, are chopped into granules 35 by a rotary cutter 34 and fall into a bin 36 ready for re-use.

6 Claims, 8 Drawing Figures

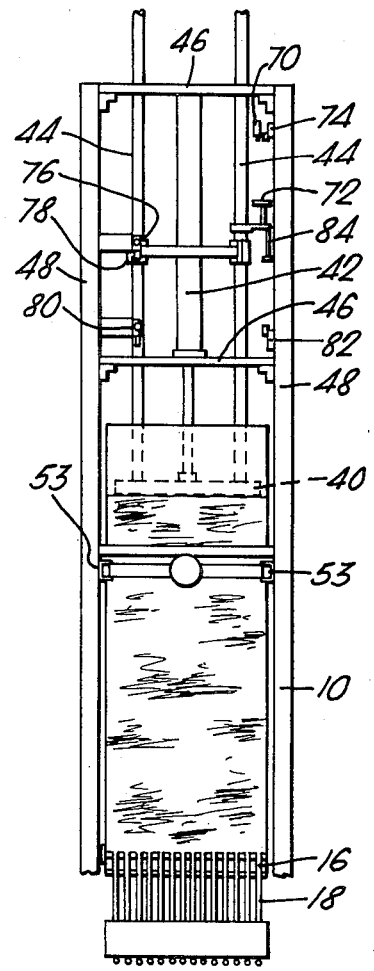
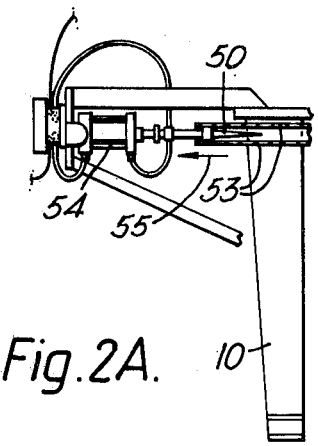
Fig. 2.
Fig. 2A.

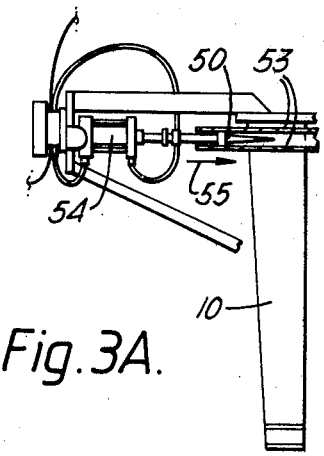
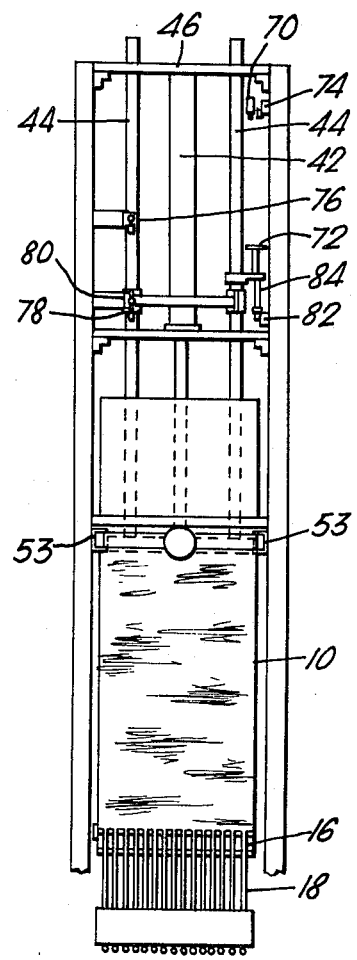
Fig. 3.
Fig. 3A.

METHOD AND APPARATUS FOR RE-CYCLING PLASTICS WASTE

This invention relates to the recycling of waste plastics material. It is particularly concerned with the re-claiming of thermoplastic materials, particularly polyolefins, as used in the textile industries, for example, the trimmed off edges and waste material associated with the collection and piecing-up of tapes split from extruded plastic sheets, but is also applicable to the re-claiming and re-cycling of other thermoplastic articles, for example, such as are used as containers for household commodities.

In the extrusion of sheets or films of thermoplastic material such, for example, as polypropylene, it is often necessary to trim a selvedge strip off each side of the extruded sheet as it leaves the quench section of the machine, in order to true up the edges. Further, when such sheets or films are slit into tapes and subsequently would into spools for weaving into fabric or for twisting into yarn for cordage it naturally is not feasible to take all of the tapes simultaneously to their respective winders. There is thus considerable waste in threading-up say one hundred and twenty winders and such waste is generally deposited in a tangled mass in an aspirator box.

In view of the high cost of the raw material itself it is important that the waste should be re-claimed. Various methods are already available for reducing the strips to relatively small particles suitable for mixing with fresh granules of material for feeding to an extruder. For example, the strips may be compacted and then passed through a cutter which reduces them to small chips. Alternatively, the strips may be subjected to frictional forces between a pair of rotating discs which generate sufficient heat to melt the material which is then formed into small particles. In whatever way the material is re-claimed it is generally necessary to segregate stretched film from unstretched film and to physically monitor the rate of feed to the reclamation system.

According to the present invention, waste thermoplastics material is re-claimed by melting it and extruding it in a form which can be readily cut up to form granules, the waste material being fed to the inlet of the extruder in synchronism with the operation of a reciprocating plunger by which the material is compressed on each operative stroke and then is held in a compressed state against the effect of its own resilience by a restraining member which comes into action before the compressed material can expand again, is withdrawn again before the end of the next compression stroke to allow a fresh charge of material to be fully compressed into contact with the preceding charge and then returns to its restraining position, the compressed material being progressively melted and extruded under the effect of the pressure thus maintained.

The effect of the synchronised steps of compressing the waste material and then restraining it in the compressed state while the next charge is fed into the path of the plunger enables a relatively steady pressure to be maintained on the charge within the extruder which is necessary in order to maintain a regular flow through the extrusion nozzles, since it is this pressure which forces the melted material through the nozzles. In conventional extruders, the necessary steady pressure is maintained by a screw feeder acting on the granules to be melted. It will be appreciated however that such a system cannot readily accommodate an erratic input of irregularly formed waste material owing primarily to the relatively small cross section of the helical feed passage and the difficulty of introducing the large, irregularly shaped pieces of waste material to such a passage as well as the necessity of keeping the constantly rotating screw fully charged.

A method in accordance with the invention enables a relatively steady pressure to be maintained without the need for a screw feeder and it enables not only irregularly shaped thermoplastic articles to be re-claimed, but also material in elongate form, e.g. waste sliver and the strip material referred to above which, owing to its particular characteristics, namely its voluminous and springy nature as well as its relative lightness is extremely difficult to compress, and but for the synchronised steps just referred to could not be fed to an extruder without an uneconomical amount of preparation.

As a result of intermittent feeding together with the restraining step at the end of each compression step, it is possible to feed the material steadily into the extruder and moreover to exert a relatively steady pressure on the material both prior to and subsequent to melting so that relatively constant extrusion conditions can be maintained.

The molten material may, for example, be continuously extruded as a series of strands which are drawn under controlled tension down to a thickness corresponding to the size of granule ultimately required, after which they may be formed into granules by means of a cutter, suitable for direct re-use.

Apparatus in accordance with the invention operating in accordance with the method just described, comprises an extruder, a plunger which is reciprocable in relation to an inlet to the extruder so as to compress thermoplastic material into the extruder, a feeding device which is intermittently operable in synchronism with the plunger to feed material to the inlet of the extruder prior to each compressive stroke of the plunger and a restraining member, also operable in synchronism with the plunger which, in operation, is moved to its restraining position at the end of each compressive stroke of the plunger and is withdrawn again before the end of the next compressive stroke. In other words, during steady operation, a charge of material is fed to the space between the plunger and the restraining member as the plunger starts its compressive stroke and this charge of material is compressed between the plunger and the restraining member until shortly before the end of the compressive stroke is reached. At this point, the restraining member is withdrawn and the new charge of material is further compressed against the previously compressed charge of material, as the plunger completes its compressive stroke. But for the restraining member, the compressed material would immediately spring back as soon as the plunger started its return stroke, but as the plunger reaches the end of its compression stroke, the restraining member is again moved into its restraining position, thus preventing the charge springing back and enabling the plunger to make its return stroke to leave space for the next charge of material to be compressed, after which the cycle is repeated.

The plunger is conveniently driven hydraulically under the control of valves which are switched by movement of the plunger itself as it reaches the respective ends of its stroke. In other words, as the plunger reaches the end of its return stroke, a valve is operated so as to apply hydraulic pressure to force the plunger back along its compression stroke, while at the end of the compression stroke, a further valve is operated to cause the hydraulic pressure to retract the plunger once again.

The restraining member is conveniently a fluid-pressure-operated flat assembly of spaced tines moving at an angle to the stroke of the plunger with the tines fitting into corresponding recesses in the surface of the plunger. The fluid pressure cylinder controlling the movement of the restraining member may be brought into action by movement of the plunger shortly before the latter reaches the end of its compression stroke so as to withdraw the restraining member and may be further activated to re-insert it by operation of a further switch which reverses the operation of the fluid pressure cylinder as the plunger reaches the end of its stroke.

The feeding device may be in the form of a conveyor, e.g. electrically driven, which supplies the strip material to the inlet of the extruder and which is caused to start and stop at appropriate instants under the control of a switch or switches operated by movement of the plunger. For example, a single switch may be used, being closed when the plunger reaches the end of its return stroke in order to start the feed of strip material and remaining closed until a proportion of the next compressive stroke has been made, after which the feed stops.

An example of apparatus in accordance with the invention will now be described, with reference to the accompanying drawings, in which:

FIG. 2 is a side view to an enlarged scale of the extruder seen in FIG. 1, again with a wall removed and the plunger approaching the end of its compressive stroke;

FIG. 2A is an elevation of the restraining member in its retracted position corresponding to the position of the plunger in FIG. 2;

FIG. 3 is a view similar to FIG. 2 but showing a slightly later stage in the cycle of operation;

FIG. 3A is a view similar to FIG. 2A and also showing a slightly larger stage in the cycle of operation.

Figure 1:
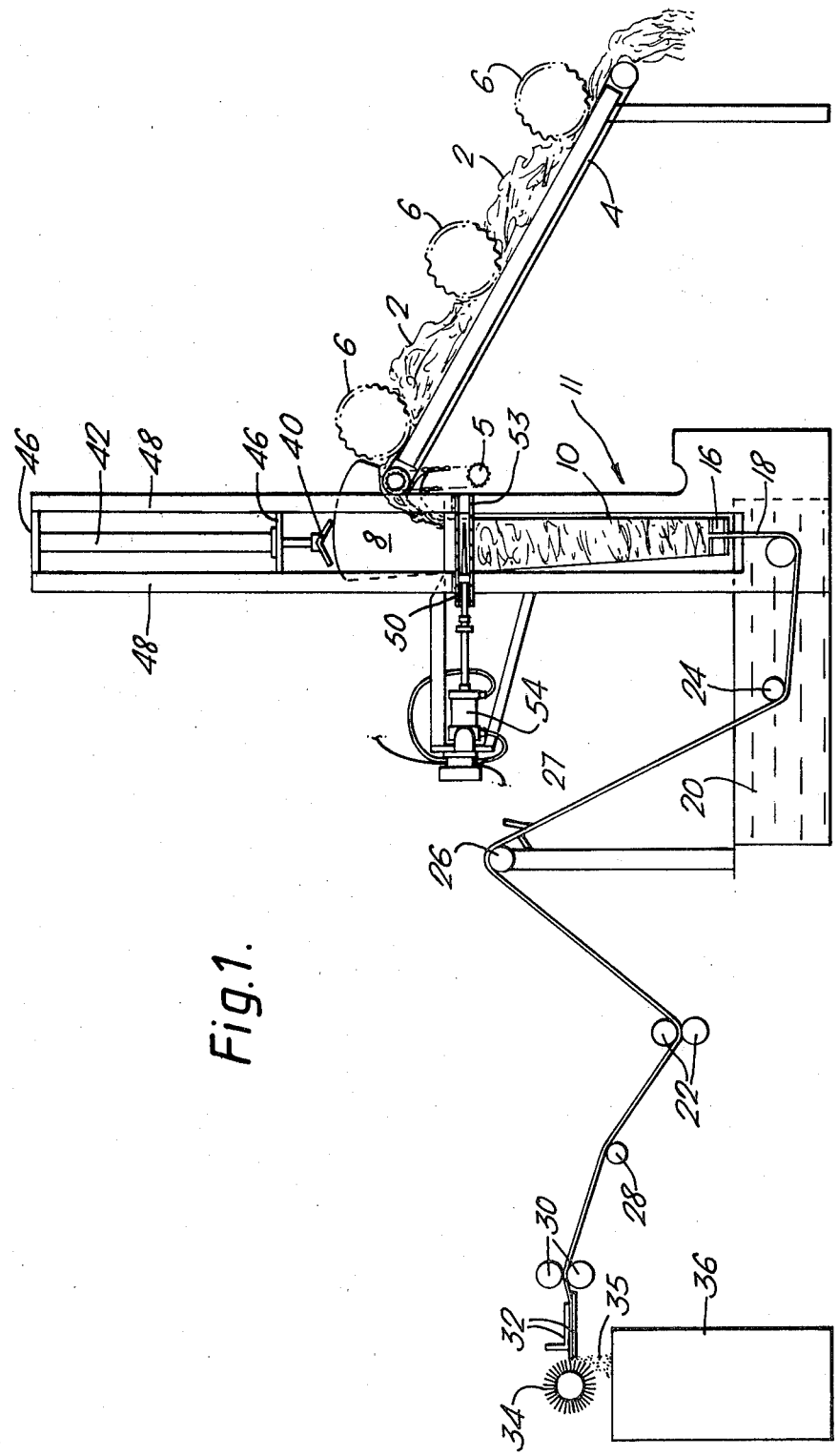
FIG. 1 is an elevation of the apparatus as a whole with one side of an extruder removed to show a restraining member in its operative position and a plunger in its retracted position.

Turning first to FIG. 1, bundles 2 of strip thermoplastic material are being fed upwardly and to the left by means of a conveyor belt 4 to which they are supplied manually. The belt 4 is driven by an electric motor 5 and the strip material passes under a number of corrugated rollers 6 which help to partially flatten the springy material as it passes to a compression chamber 8 at the inlet of a heating box 10 forming part of an extruder indicated generally as 11. The strip material is compressed in the chamber 8 as will be described later, and is forced under pressure into the heating box 10, this pressure also acting on the molten material at the bottom of the extruder 11 and extruding it through a series of orifices in a die plate 16 in the form of strands 18 which pass into a water bath 20 where they solidify. Driven rollers 22 draw the newly formed strands 18 through the water bath under controlled tension which determines their thickness, the speed of the rollers 22 being adjustable for this purpose. The strands pass ground guide rollers 24 and 26 and scrapers 27 for removing residual water, on their way to the drawing rollers 22 and then over a guide 28 which ensures that the strands are separate from one another before they reach a pair of rollers 30 which deliver them between guide plates 32 to a rotary cutter 34 which chops the strands into granules 35 which fall into a bin 36 ready for re-use. If two or more extruders are operated in parallel, a single common cutter may be used in conjunction with a single collection bin.

Turning back to the compression of the strip material in the chamber 8, this is accomplished by a plunger 40 operated by a hydraulic cylinder 42 and, as seen in FIGS. 2 and 3, fitted with stabilising rods 44 passing through cross members 46 extending between uprights 48. A restraining member 50 comprising individual tines 51 extending from a common cross member 52 is controlled by a pair of fluid pressure cylinders 54 so as to move transversely to the plunger 40 along slides 53 fixed to the sides of the chamber 8. The cylinders 54 are preferably pneumatically operated, but may alternatively be operated by hydraulic pressure.

In the position shown in FIG. 1, the plunger 40 is at the end of its return stroke and feed of strip material 2 to the compression chamber 8 has started. This material rests on top of the restraining member 50 to be compressed as the plunger 40 descends. After a short range of travel of the plunger 40, the feed of material 2 stops and compression starts. Just before the plunger 40 reaches the end of its compression stroke, the restraining member 50 is retracted as indicated by an arrow 55 in FIG. 2A, the member 50 not being visible in FIG. 2. The strip material which had previously been above the restraining member 50 thus comes into contact with that below the restraining member and is compressed against it by descent of the plunger 40, this pressure also serving to force molten material through the orifices in the die plate 16. As the plunger 40 reaches the limit of its compressive stroke, as seen in FIG. 3, the restraining member 50 (not visible in FIG. 3) is re-inserted as indicated by the arrow 56 in FIG. 3A. This ensures that as the plunger 40 returns again, the strip material is held in its compressed condition and pressure is maintained downwardly through the molten material at the bottom of the heater box 10. The plunger 40 then moves upwardly until it reaches the end of its return stroke, after which the cycle is repeated, as already described.

Figure 4A:
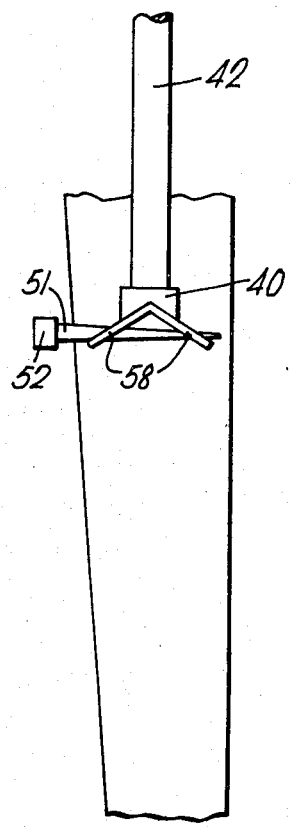
FIGS. 4A, 4B and 4C are detailed views showing the relationship between the restraining member and the plunger at the end of the compressive stroke of the latter.
Figure 4B:
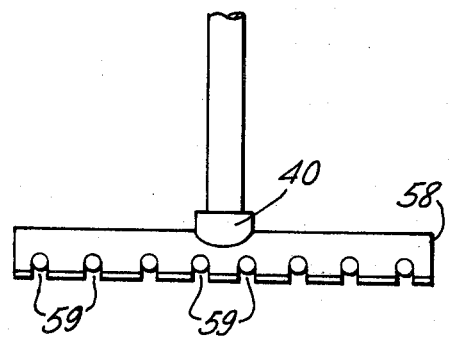
Figure 4C:
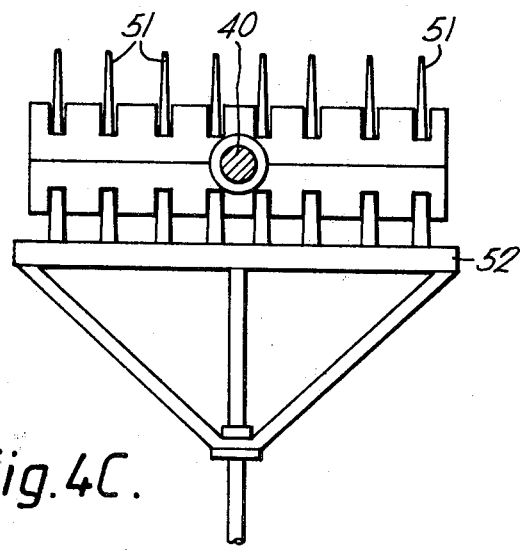

The operative face of the plunger 40 is in the form of a block 58 and in order to ensure that the restraining member 50 holds the compressed material in the condition to which is has been compressed by descent of the plunger 40, the block 58 is formed with recesses 59 to accommodate the individual tines 51 of the restraining member. In other words, the plunger 40 and the restraining member 50 inter-fit as seen in end view in FIG. 4A, in elevation as seen in FIG. 4B and as seen in plan in FIG. 4C. Accordingly, when the plunger 40 starts to rise again, any return movement of the compressed material is virtually eliminated.

The sequence of operation whereby the feed of the strip material and movements of the restraining member 50 are synchronized with movement of the plunger 40 are controlled by a number of valves or switches, of which the operation will now be described. As the plunger 40 approaches the end of its return stroke, a switch 70 is operated by a member 72 carried by one of the stabilising rods 44 and starts the electric motor 5 to start feed of the material 2. A short time later a valve 74 is engaged by the member 72 which controls the hydraulic cylinder 42 so as to cause the plunger 40 to begin its compressive stroke. As soon as it has travelled a short distance, the member 72 loses contact with the switch 70 and the feed of strip material stops, the material already fed to the chamber 8 then being compressed against the restraining member 50.

As the plunger 40 reaches the position of FIG. 2, a valve 76 is depressed by a member 78 projecting from one of the stabilising rods 44. This valve 76 controls the cylinders 54 to withdraw the restraining member 50, the strip material then being compressed against that already in the heating box 10 as previously decribed. When the plunger reaches the end of its stroke as shown in FIG. 3, a further valve 80 engaged by the member 78 causes the cylinders 54 to operate in the reverse direction and re-insert the tines to the position shown in FIG. 1. This occurs just fractionally in advance of yet a further valve 82 being engaged by a member 84 on the stabilising rod 44, thus controlling the hydraulic cylinder 42 to reverse the movement of the plunger 40 to start the return stroke. During its return stroke, the ascending member 78 passes the valve 76 which is not operated since it is fitted with a one-way actuating arrangement. The plunger 40 then continues to the top of its stroke to complete the cycle.

The valves of switches may, of course, be activated by photo-electric devices if desired rather than by direct mechanical action.

I claim:

1. Apparatus for re-claiming resilient thermoplastics material comprising an extruder having an inlet, a plunger, a heater to melt said thermoplastics material and an outlet, means for reciprocating said plunger in relation to said inlet to said extruder whereby to compress thermoplastic material into said extruder, a feeding device for said thermoplastic material, means for intermittently operating said feeding device in synchronism with said plunger to feed material to said inlet to said extruder prior to each compressive stroke of said plunger, a restraining member comprising an assembly of spaced tines for holding said resilient material in said inlet of said extruder in a compressed condition and means for operating said restraining member in synchronism with said plunger, whereby said member is moved to its restraining position at approximately the end of each compressive stroke of said plunger and is withdrawn again before the end of the next compressive stroke of said plunger.

2. Apparatus according to claim 1 wherein said means for reciprocating said plunger is hydraulically operated, said apparatus also including valves for controlling said hydraulically operating means, said valves being switched by movement of said plunger as said plunger reaches respective ends of the stroke thereof.

3. Apparatus according to claim 1 or claim 2 wherein said restraining member comprises a flat assembly of spaced tines, said plunger having its surface formed with recesses for receiving said tines, said operating means for said restraining member being fluid-pressurised and operated and serving to move said restraining member at an angle to the stroke of said plunger.

4. Apparatus according to claim 3 and including guide means for said restraining member extending in a direction normal to the stroke of said plunger.

5. Apparatus according to claim 4 wherein said operating means for said restraining member comprises a fluid-pressure cylinder, said apparatus also including a first fluid pressure valve actuated by movement of said plunger as said plunger approaches the end of the compression stroke thereof so as to control said fluid-pressure cylinder to withdraw said restraining member and a second fluid-pressure valve actuated by movement of said plunger as said plunger reaches the end of the stroke thereof, to reverse the operation of said fluid-pressure cylinder whereby to re-insert said restraining member.

6. Apparatus according to claim 1 wherein said feeding device comprises a conveyor, driving means for said conveyor and a switch operated by movement of said plunger for starting and stopping said driving means.

* * * * *